United States Patent Office 3,504,087
Patented Mar. 31, 1970

3,504,087
6-SUBSTITUTED DERIVATIVES OF 16-METHYL-4-PREGNENE-3β-OL-ONE
Klaus Irmscher, Karl-Heinz Bork, Hans-Gunther Kraft, and Hartmut Kieser, Darmstadt, Germany, assignors to E. Merck AG., Darmstadt, Germany
No Drawing. Filed July 27, 1967, Ser. No. 656,352
Claims priority, application Germany, Aug. 6, 1966, M 70,493; Aug. 12, 1966, M 70,554; Feb. 9, 1967, M 72,705; Mar. 3, 1967, M 73,009; May 20, 1967, M 74,052
Int. Cl. A61k 17/00
U.S. Cl. 424—243                    8 Claims

ABSTRACT OF THE DISCLOSURE

Steroids and the $\Delta^{6(7)}$ derivatives thereof of the formula:

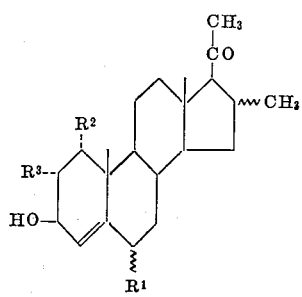

wherein $R^1$ is F, Cl, Br, $CH_3$ or $CF_3$; and
$R^2$ and $R^3$ each represents hydrogen or together represent —$CH_2$—, such species possess gestagenic, ovulation-inhibiting, cycle-influencing, antiandrogenic, antiestrogenic, antifertility, and gonadotropin-influencing activities.

---

Applicants hereby claim the benefit of the filing dates of German patent applications as follows: M 70,493, filed Aug. 6, 1966; M 70,554, filed Aug. 12, 1966; M 72,705, filed Feb. 9, 1967; M 73,009, filed Mar. 3, 1967; M 74,052, filed May 20, 1967.

This invention relates to steroids of the pregnane series, in particular to derivatives of 16-methyl-4-pregnene-3β-ol-20-one.

SUMMARY OF THE INVENTION

Objects of this invention are to provide novel steroids, methods of their production, pharmaceutical compositions based thereon, and processes of effecting various pharmaceutical utilities by administering such steroids to mammals.

Upon further study of the specification and claims, other objects and advantages of the present invention will become apparent.

To attain these objects, there are provided compounds of the Formula I:

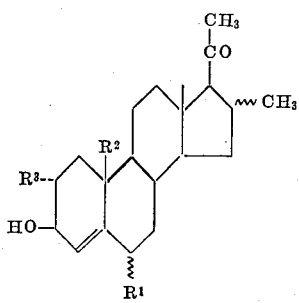

I wherein $R^1$ represents F, Cl, Br, $CH_3$, or $CF_3$; $R^2$ and $R^3$ are each H, or together —$CH_2$—; and wherein additional double bond is optionally present in the 6(7)-position.

These compounds possess valuable pharmacological properties, in particular, gestagenic, ovulation-inhibiting, cycle-influencing, antiandrogenic, gonadotropin-influencing, antiestrogenic, and anti-fertility effects. For example, the antiestrogenic effect of 6α,16α-dimethyl-4-pregnene-3β-ol-20-one exceeds by two to three times the same effect of 6α,16α-dimethyl-progesterone.

Compounds of Formula I can, accordingly, be employed as drugs or also as intermediates for the preparation of different drugs.

The preparation of compounds of Formula I is accomplished by any of the following methods:

(a) A functionally modified 20-keto-group in a derivative which otherwise corresponds to Formula I is treated to liberate the keto group by a conventional manner, such as by solvolysis; or (b) A progesterone derivative of the general Formula II:

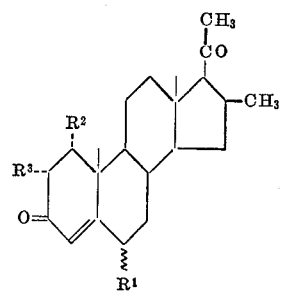

II wherein $R^1$ to $R^3$ have the above-indicated meanings; and wherein an additional double bond is optionally present in the 6(7)-position, is reacted with lithium-aluminum-tri-tert.-butoxyhydride or diborane in an inert solvent, or with sodium borohydride in pyridine, methanol, or anhydrous isopropanol; or (c) A 3β,20-diacyloxy-17α-hydroxy-4-pregnene of the general Formula III:

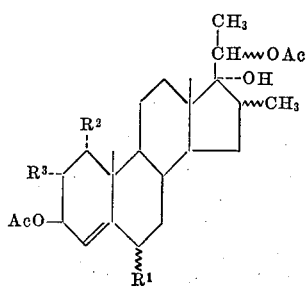

III wherein Ac represents alkanoyl of 1–6 carbon atoms; $R^1$ to $R^3$ have the above-indicated meanings; and wherein an additional double bond is optionally present in the 6(7)-position, is treated with zinc, and the product is thereafter hydrolyzed with a strong base or a strong acid. In this connection, Ac preferably represents acetyl, but formyl, propionyl, butyryl, isobutyryl, valeryl, or capronyl are also quite suitable.

DETAILED DISCUSSION OF THE INVENTION

Componuds of Formula I can be obtained by solvolysis, preferably hydrolysis, of the corresponding functional modified 20-keto-derivatives. Preferred keto-derivatives are the semicarbazones and the ethylene ketals.

The semicarbazones can be obtained in a conventional manner from the progesterone derivatives of Formula II, by first blocking the 3-keto-group thereof in an enamic form, then reacting with semicarbazide, again liberating the 3-keto-group with dilute acid, and subsequently reducing, for example, with sodium borohydride.

The ethylene ketals are obtainable, for example, by ketalization of corresponding 3β-hydroxy-5-pregnene-20-ones and subsequent Oppenauer oxidation and reduction in the 3-position. Further suitable functional derivatives of the compounds of Formula I are other ketals, e.g., the dimethyl, diethyl, or propylene ketals, as well as the thioketals (ethylene, propylene dimethyl, or diethyl-thioketals), hemithioketals (ethylene, propylene, dimethyl, or diethylhemithioketals), thioenol ethers, cyanohydrins, oximes, phenylhydrazones, and Girard derivatives (e.g., Girard-T derivatives, a Girard-T reagent being (carboxymethyl) trimethylammonium chloride hydrazide.)

The solvolysis of the above-mentioned 20-keto-derivatives is conducted in a conventional manner as described in the literature. The ketals are preferably split by treatment with dilute acids. Suiaable acids are, for example, hydrochloric acid, sulfuric acid, perchloric acid, phosphoric acid, p-toluenesulfonic acid, oxalic acid, acetic acid, as well as Lewis acids, such as boron trifluoride etherate. Usually, an inert solvent is additionally employed, such as methanol, ethanol, acetone, dioxane, ether, tetrahydrofuran, benzene, chloroform, or methylene chloride, or mixtures of these solvents, if desired, with the addition of water. Acetic acid can simultaneously serve as the reactant and the solvent. The scission reaction takes place at room temperature, but the reaction can also be conducted at temperatures up to the boiling temperature of the solvent employed. Depending upon the other conditions, the reaction time is from a few minutes up to 24 hours.

Thioketals and thioenol ethers are suitably split by treatment with mercuric chloride/cadmium carbonate at room temperature or under heating, preferably in aqueous acetone, or by hydrolysis with dilute hydrochloric acid or sulfuric acid. Hemithioketals are split by the same acids with mercuric chloride or with Raney nickel, for example, in acetic acid in the presence of sodium acetate. An acidic medium is also favorable for the scission of semicarbazones, oximes, phenylhydrazones, and Girard-T derivatives. The cyanohydrins, however, are spit with bases, such as methanolic potassium methylate or pyridine.

It is also possible to conduct the scission step in the presence of a carbonyl compound, the latter, in turn, reacting with the liberated reactant with the formation of the corresponding derivative. Thus, the semicarbazones are converted into the free keto compounds in a particularly advantageous manner by treatment with pyruvic acid. The reaction is conducted, for example, in aqueous dioxane or in aqueous acetic acid, at room temperature or, more suitably, at elevated temperatures up to the boiling point of the solvent employed.

The compounds of Formula I can also be obtained by the selective reduction of the progesterone derivatives of Formula II with sodium borohydride, either in pyridine or in anhydrous isopropanol at room temperature. It is known from the literature that under these conditions the 3-keto-group is selectively reduced in progesterones even where the 20-keto-group is not sterically protected, for example, by a substituent in the 17-position. The keto group in the 20-position is, on the whole, not attacked in this reaction, and the desired compounds of Formula I are obtained after reaction times of between about 4 and 24 hours.

The compounds of Formula I can also advantageously be prepared by reacting, in a conventional manner, a compound of Formula II with diborane in an inert solvent, and then hydrolyzing the thus-produced adduct. Particularly suitable inert solvents, in this connection, are ethers, for example diethyl ether, tetrahydrofuran, or diglyme (diethylene glycol dimethyl ether). The reaction is preferably conducted at temperatures between 0 and 35° C., particularly at room temperature. The reaction is normally terminated after ½ to 3 hours. The diborane is suitably produced from sodium borohydride and boron trifluoride etherate. The hydrolysis of the thus-formed adduct is carried out in accordance with conventional methods, e.g., with water, acids, or hydrogen peroxide in an alkaline solution. If the hydrolysis is conducted in an acidic medium, then the conditions must be selected so as to avoid a dehydration reaction resulting in the formation of the corresponding 2,4-diene- or 2,4,6-triene-compound.

It was further found that compounds of Formula II are also selectively reduced in only the 3-position by reaction with lithium-aluminum-tri-tert.-butoxyhydride in an inert solvent, or with sodium borohydride in methanol, i.e., without the use of the special "isopropanol effect."

According to the state of the art, under these conditions, such a selective reduction would have been expected only for 17-substituted compounds. However, a methyl group in the 16-position likewise has an unexpected blocking effect upon the 20-keto-group, so that the 20-keto-group is not attacked even under these reaction conditions. In this connection, when using these methods, there are generally obtained higher yields than in the conventional methods.

For conducting the reaction with lithium-aluminum-tri-tert.-butoxyhydride, particularly suitable solvents are ether, such as diethyl ether, diisopropyl ether, tetrahydrofuran, and dioxane, as well as mixtures of same with one another or with hydrocarbons, such as benzene. The reaction is suitably conducted at room temperature and is terminated after about ½ to 3 hours. However, it is likewise possible to heat the reaction mixture, if desired, up to the boiling point of the solvent employed, the reaction times being correspondingly shorter.

The reaction with sodium borohydride in methanol is suitably carried out at temperatures between about 0° C. and room tempearture. Under these conditions, the reaction takes about ½ to 3 hours; at higher temperatures, it is correspondingly shorter.

Still another method of preparing the compounds of Formula I consists in treating a 3β,20-diacyloxy-17α-hydroxy-4pregnene of Formula III with zinc and subsequently hydrolyzing the thus-obtained product. Particularly suitable starting compounds are the 3β,20-diacetoxy compounds. Either a sublimation step is conducted in the presence of zinc powder (Serini-Logemann reaction) at temperatures between 150 and 200° C., preferably around 180° C., under reduced pressure, or the starting material is boiled several hours with zinc dust in toluene or a similar inert solvent. During the reaction, there occurs an inversion at the C(17). The thus-obtained 3β-acyloxy-17-iso-4-pregnene-20-one is subsequently saponified by treatment with a strong base or a strong acid, and simultaneously isomerized on the C(17). Suitably, methanolic or ethanolic sodium or potassium hydroxide is employed and the reaction solution is heated for 1 to 4 hours to the boiling point.

The 16α- or 16β-methyl-progesterones of Formula II employed as the starting compounds according to this invention are either known, or they can be readily produced analogously to conventional compounds. Thus, 6β-chloro- or 6β-bromo-16-methylprogesterones are obtainable by reacting the 3-ethylenol ethers of the basic 16-methyl-progesterones with N-chloro- or N-bromo-succinimide. Treating the 6β-halogen-compounds with strong acids, e.g., hydrogen chloride in glacial acetic acid or chloroform yields the 6α-halogen-derivatives. Those starting compounds containing an additional double bond in the 6(7)-position can be produced from the corresponding saturated 16-methyl-progesterones by reaction with chloranil.

For producing the compounds of Formula II ($R^1$= $CH_3$, $R^2$ and $R^3$= —$CH_2$—), the initial 6,16-dimethyl-progesterones can be converted by dehydrogenation with 2,3-dichloro-5,6-dicyano-1,4-benzoquinone (or, optionally, first with chloranil) into the corresponding 1-dehydro- (or 1,6-bis-dehydro-) derivatives, from which, by reacting same with trimethylsulfoxonium iodide, there can be prepared 1α, 2α-methylene-16α- and -16β-methyl-progesterones (or the 6-dehydro-derivatives thereof). The 1α, 2α-methylene-6-dehydro-compounds can also be obtained from the 1,6-bis-dehydro-derivatives by using diazomethane.

The analogously obtainable 1α,2α-methylene-6-dehydro-16-methyl-progesterones which are unsubstituted in the 6-position can be converted into the corresponding 6-halogeno-6-dehydro-derivatives by one of several processes. For example, the starting compound can first be converted into the corresponding 6α,7α-epoxide by an organic peracid; then this epoxide can be reacted with hydrochloric acid and the thus-obtained 1α-chloromethyl-6-chloro-16α- or -16β-methyl-6-rehydro-progesterone can be treated with a base, such as collidine, the cyclopropane ring being closed and there being obtained 1α, 2α-methylene-6-chloro-16α- or -16β-methyl-6-dehydro-progesterone. In a similar manner, the 6-bromo-6-dehydro-compound is obtained by reacting the same starting compound with hydrochloric acid to obtain the 1α-chloromethyl-16α- or -16β-methyl-6-dehydro-progesterone, reacting this compound with an organic peracid to the 6α,-7α-epoxide, splitting of the latter, with concomitant dehydration, with hydrobromic acid in glacial acetic acid, and ring closure with collidine.

By reacting the above-mentioned 1α-chloromethyl-6α,-7α-epoxy-16α- or -16β-methyl-progesterone with hydrogen fluoride in chloroform/tetrahydrofuran, subsequent liberation of water with hydrogen bromide in glacial acetic acid, and ring closure with collidine, there is obtained 1α,2α-methylene-6-fluoro-6-dehydro-16α- or -16β-methyl-progesterone.

Conversion of the 16α- or 16β-methyl-progesterone into the corresponding 3-enol ethers, reaction with trifluoromethyl iodide, and subsequent treatment with an acid leads to 6α-trifluoromethyl-16α- or -16β-methyl-progesterone. From these compounds, the 1,6-bis-dehydro-derivatives are obtained by dehydrogenation with chloranil and 2,3-dichloro-5,6-decyano-1,4-benzoquinone; and the resultant 1,6-bis-dehydro-derivatives can be converted, by treatment with diazomethane or trimethylsulfoxonium iodide, into the corresponding 1α,2α-methylene-6-trifluoromethyl-6-dehydro-progesterones.

The starting compounds saturated in the 6(7)-position can also be obtained by reducing the 6-dehydro-progesterones. Catalytic hydrogenation on 1% palladium charcoal in ethanol, with the addition of an organic or inorganic base, leads to the 6α-substituted compounds; whereas reacting the 6-dehydro-derivative with cyclohexene in alcohol in the presence of palladium charcoal leads to the 6β-substituted compounds.

The starting compounds of Formula III can be obtained by reducing corresponding 17α-acetoxy-progesterones (for example, with lithium aluminum hydride) to the basic 3β,17α,20-triols and subjecting the resultant triols to partial acylation in a subsequent step.

Typical starting substances of Formula II are the following:

6α- and 6β-fluoro-16α-methyl-progesterone,
6α- and 6β-fluoro-16β-methyl-progesterone,
6α- and 6β-chloro-16α-methyl-progesterone,
6α- and 6β-chloro-16β-methyl-progesterone,
6α- and 6β-bromo-16α-methyl-progesterone,
6α- and 6β-bromo-16β-methyl-progesterone,
6α,16α-,6α,16β-,6β,16α-, and 6β,16β-dimethyl-progesterone,
6α- and 6β-trifluoromethyl-16α-methyl-progesterone,
6α- and 6β-trifluoromethyl-16β-methyl-progesterone,
6-fluoro-, 6-chloro-, 6-bromo- and 6-trifluoromethyl-6-dehydro-16α-methyl-progesterone,
6-fluoro-, 6-chloro-, 6-bromo- and 6-trifluoromethyl-6-dehydro-16β-methyl-progesterone,
6,16α- and 6,16β-dimethyl-6-dehydro-progesterone, as well as the corresponding 1α,2α-methylene compounds.

Typical starting compounds of Formula III are:

3β,20-diacetoxy-6α- and -6β-fluoro-16α-methyl-4-pregnene-17α-ol,
3β,20-diacetoxy-6α- and -6β-fluoro-16β-methyl-4-pregnene-17α-ol,
3β,20 - diacetoxy - 6α- and -6β - chloro - 16α-methyl-4-pregnene-16α-ol,
3β - 20 - diacetoxy - 6α- and -6β - chloro-16β-methyl-4-pregnene-17α-ol,
3β,20 - diacetoxy - 6α- and -6β - bromo - 16α-methyl-4-pregnene-17α-ol,
3β,20 - diacetoxy - 6α- and -6β - bromo - 16β-methyl-4-pregnene-17α-ol,
3β,20-diacetoxy-6α,16α-, -6α,16β-, -6β,16α- and -6β,16β-dimethyl-4-pregnene-17α-ol,
3β,20-diacetoxy-6α- and -6β-trifluoromethyl-16α-methyl-4-pregnene-17α-ol,
3β,20-diacetoxy-6α- and -6β-trifluoromethyl-16β-methyl-4-pregnene-17α-ol,
3β,20-, diacetoxy-6-fluoro-, -6-chloro-, -6-bromo-, and -6-trifluoromethyl-16α-methyl-4,6-pregnadiene-17α-ol,
3β,20-diacetoxy-6-fluoro-, -6-chloro-, -6-bromo-, and -6-trifluoromethyl-16β-methyl-4,6-pregnadiene-17α-ol,
3β,20 - diacetoxy - 6,16α- and -6,16β - dimethyl - 4,6-pregnadiene-17α-ol, as well as the corresponding 1α,2α-methylene compounds.

The preferred final products of Formula I are as follows:

(a) Compounds wherein $R^2$ and $R^3$ each represents hydrogen, and a single bond is present in the 6,7-position;

(b) Compounds wherein $R^2$ and $R^3$ each represents hydrogen, and a double bond is present in the 6,7-position;

(c) Compounds wherein $R^2$ and $R^3$ together represent methylene, and a single bond is present in the 6,7-position; and (d) Compounds wherein $R^2$ and $R^3$ together represent methylene, and there is a double bond in the 6,7-position.

Among these produced products, those having a 16α-methyl-group are most preferred.

The isolation of the products obtained in accordance with this invention is conducted in the usual manner by extraction, crystallization, and/or chromatography, etc.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, Vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The novel compounds are generally administered to mammals in dosages of 0.1 to 100, preferably 0.1–50, more preferably 0.5–5 mg. per dosage unit. Generally, the amount of carrier per dosage unit is about 1–5,000 mg.

The antiestrogenic effect of the compounds was determined by the method of Dorfman, Kincl and Ringold, Endocrinology, volume 68, page 17 (1961). The compounds were applied orally on mice.

The compounds of the general Formula I can, furthermore, be used as intermediates for the preparation of other pharmacologically valuable compounds, such as their 3-esters and 3-ethers.

Without further elaboration, it is believed that one skilled in the art can, using the preceding description, utilize the present invention to its fullest extent. The following prefered specific embodiments are, therefore, to be construed as merely illustrative, and not limitative of the remainder of the disclosure in any way whatsoever.

EXAMPLE 1

In a mixture of 12 ml. dioxane, 6 ml. water, and 0.5 ml. pyruvic acid, there is heated for 20 minutes to 95° C. 0.72 g. 6α,16α-dimethyl - 4 - pregnen-3β-ol-20-one semicarbazone (obtainable by reacting 6α,16α-dimethyl-progesterone with pyrrolidine in methanol to the 3-enamine, conversion of the latter to the 20-semicarbazone thereof, selective acid hydrolysis to 6α,16α-dimethyl-progesterone-20-semicarbazone, and reduction with sodium borohydride in methanol). The reaction mixture is diluted with water and extracted with methylene chloride. The extracts are washed with water and concentrated by evaporation. From the residue, there crystallizes with petroleum ether 0.51 g. 6α,16α-dimethyl-4-pregnen-3β-ol-20-one, M.P. 131–134° C. (from acetone/petroleum ether); [α]$_D$ +90.7° (dioxane).

EXAMPLE 2

A solution of 0.4 g. 6α,16α-dimethyl-4-pregnen-3β-ol-20-one-ethylene ketal and 20 mg. oxalic acid in 30 ml. ethanol is allowed to stand for 36 hours at room temperature. Then, the reaction mixture is neutralized with aqueous ammonia solution, concentrated under reduced pressure, and diluted with water. The thus-separated 6α,16α - dimethyl - 4 - pregnen-3β-ol-20-one is vacuum-filtered (0.38 g.) and recrystallized from acetone/petroleum ether; M.P. 131–134° C.

The starting material is produced as follows:

2 g. 6,16α,dimethyl-5-pregnen 3β-ol-20-one are boiled on a water trap for 24 hours in 190 ml. benzene with 10 ml. ethylene glycol and 1 g. p-toluenesulfonic acid monohydrate. The thus-obtained crude ketal (1.84 g.) is boiled for 24 hours together with 0.8 g. aluminum isopropylate in 40 ml. toluene and 10 ml. cyclohexanone, there being obtained as the main product 6α,16α-dimethyl-progesterone-20-ethylene ketal (1.2 g.; M.P. 175–176° C., from methanol). This product (0.88 g.) is allowed to stand at room temperature for 1.5 hours with 0.174 g. sodium borohydride in 17.6 ml. absolute methanol and 17.3 ml. absolute tetrahydrofuran. After the reaction mixture has been worked up in the usual manner, there is obtained 0.5 g. 6α,16α - dimethyl-4-pregnen-3β-ol-20-one-20-ethylene ketal, M.P. 151–152° C. (from acetone).

EXAMPLE 3

A solution of 1.9 g. 6α,16α-dimethyl-progesterone in 66.5 ml. absolute tetrahydrofuran is mixed, under stirring, with 5.7 g. lithium - aluminum - tri-tert.-butoxy-hydride. After 90 minutes, the reaction mixture is poured into 500 ml. ice water containing 22.8 ml. 5% sulfuric acid. The reaction mixture is extracted with chloroform; the chloroform solution, washed neutral, is dried over sodium sulfate, concentrated to about 20 ml., and chromatographed on three preparative silica gel plates (silica gel HF$_{254+366}$; E. Merck A.G.) with chloroform/petroleum ether (5:1) as the mobile phase. The silica gel layer containing the desired product is removed from the plates and extracted with chloroform-methanol 1:1. From the evaporated extracts, there crystallizes upon trituration with petroleum ether 0.6 g. of 6α,16α-dimethyl-4-pregnen-3β-ol-20-one, M.P. 131–134° C.

Analogously, the following compounds are obtained:

From 6β,16α-dimethyl-progesterone: 6β,16α-dimethyl-4-pregnen-3β-ol-20-one, M.P. 176–177° C.; from 6α-fluoro - 16α - methyl - progesterone (reaction time: 25 minutes): 6α - fluoro-16α-methyl-4-pregnen-3β-ol-20-one, M.P. 164–167° C.; from 6-chloro-6-dehydro-16α-methyl-progesterone (M.P. 127–129° C.); 6-chloro-16α-methyl-4,6-pregnadiene-3β-ol-20-one, M.P. 173–175° C.; and from 6,16α-dimethyl-6-dehydro-progesterone: 6,16α-dimethyl-4,6-pregnadiene-3β-ol-20-one, M.P. 152–156° C.

EXAMPLE 4

A solution of 0.342 g. 6α,16α-dimethyl-progesterone in a mixture of 5 ml. tetrahydrofuran and 30 ml. methanol is mixed with 75.7 mg. sodium borohydride at 0° C. After 1 hour, several drops of glacial acetic acid are added, and the reaction mixture is concentrated to about 5 ml. under reduced pressure, diluted with water, and extracted with chloroform. The extracts are preparatively separated on silica gel, as in Example 3. There are obtained 152 mg. 6α,16α-dimethyl-4-pregnen-3β-ol-20-one, M.P. 131–134° C.

Analogously, the following compounds are obtained:

From 6β - fluoro - 16β-methyl-progesterone: 6β-fluoro-16β - methyl - 4-pregnen-3β-ol-20-one, M.P. 122–123° C. (from methanol/water); from 6α-chloro-16α-methyl-progesterone: 6α - chloro - 16α - methyl-4-pregnen-3β-ol-20-one, M.P. 183–185° C. (from acetone).

EXAMPLE 5

A solution of 1.0 g. 6α,16α-dimethyl-progesterone in 200 ml. anhydrous isopropanol is allowed to stand with 125 mg. sodium borohydride for 15 hours at room temperature. After adding 500 ml. water, the reaction mixture is shaken out several times with methylene chloride. The extract, concentrated by evaporation, is applied onto a glass plate (20 x 100 cm.) carrying a layer of silica gel HF$_{254+366}$ (E. Merck A.G.). After developing the plate three times with chloroform/petroleum ether/acetone 4:4:1, the zone containing 6α,16α-dimethyl-4-pregnen-3β-ol-20-one is removed from the plate and extracted with chloroform/methanol 1:1. From the extract, concentrated by evaporation, 0.41 g. of a pure product, M.P. 131–134° C., crystallizes upon trituration with petroleum ether.

EXAMPLE 6

A solution of 1 g. 6α,16α-dimethyl-progesterone in 10 ml. anhydrous pyridine is mixed with 125 mg. sodium borohydride. After 6 hours, the reaction mixture is diluted with 100 ml. water, and the precipitated product is vacuum-filtered, dissolved in 10 ml. methylene chloride, and purified by thin-layer chromatography analogously to Example 4. There is obtained 0.35 g. 6α,16α-dimethyl-4-pregnen-3β-ol-20-one, M.P. 131–134° C.

EXAMPLE 7

At room temperature, a stream of diborane (produced from sodium borohydride and boron trifluoride-etherate) is introduced for 50 minutes into a solution of 1.3 g. 6α,16α-dimethyl-progesterone in 30 ml. diglyme. The excess diborane is decomposed with ice water; then, the reaction mixture is mixed with 4 ml. 15% sodium hydroxide solution and, under ice cooling and agitation, dropwise with 3 ml. 30% hydrogen peroxide in the course of 30 minutes. After one additional hour, the reaction soultion is diluted with ether, the ether extract is washed neutral and concentrated by evaporation under reduced pressure. After recrystallization from acetone/petroleum ether, 0.6 g. 6α,16α-dimethyl-4-pregnen-3β-ol-20-one, M.P. 131–134° C., is obtained.

EXAMPLE 8

At 180° C./0.03 mm., 2.3 g. 6α,16α - dimethyl - 4-pregnen-3β,17α,20-triol-3,20-diacetate (obtainable by the reduction of 6β,16α - dimethyl - 17α-acetoxy-progesterone with lithium aluminum hydride and subsequent acetylation) are sublimed with 40 g. zinc dust. The sublimate is boiled in 200 ml. ether and filtered. The concentrated filtrate is heated under reflux conditions in 100 ml. 5% methanolic potassium hydroxide solution for 2 hours. The solution is concentrated under reduced pressure to a small volume and mixed with about 100 ml. water. The thus-obtained suspension is extracted with methylene chloride, and the extracts are concentrated, there being obtained 6α,16α - dimethyl - 4 - pregnen - 3β - ol - 20-one, M.P. 131–134° C.

Analogously, the following compound is obtainable:
From 6β,16α - dimethyl-4-pregnen-3β,17α,20-triol-3,20-diacetate: 6β,16α-dimethyl-4-pregnen-3β-ol-20-one, M.P. 176–177° C.

EXAMPLE 9

Analogously to Example 3, the following compounds are produced by reacting the corresponding 6-substituted 16-methyl-progesterones with lithium-tri-tert.-butoxy-hydride:

6α,16β-dimethyl-4-pregnen-3β-ol-20-one
6β,16β-dimethyl-4-pregnen-3β-ol-20-one
6α-fluoro-16β-methyl-4-pregnen-3β-ol-20-one
6β-fluoro-16α-methyl-4-pregnen-3β-ol-20-one
6β-fluoro-16β-methyl-4-pregnen-3β-ol-20-one
6α-chloro-16α-methyl-4-pregnen-3β-ol-20-one
6α-chloro-16β-methyl-4-pregnen-3β-ol-20-one
6β-chloro-16α-methyl-4-pregnen-3β-ol-20-one
6β-chloro-16β-methyl-4-pregnen-3β-ol-20-one
6α-bromo-16α-methyl-4-pregnen-3β-ol-20-one
6α-bromo-16β-methyl-4-pregnen-3β-ol-20-one
6β-bromo-16α-methyl-4-pregnen-3β-ol-20-one
6β-bromo-16β-methyl-4-pregnen-3β-ol-20-one
6α-trifluoromethyl-16α-methyl-4-pregnen-3β-ol-20-one
6α-trifluoromethyl-16β-methyl-4-pregnen-3β-ol-20-one
6β-trifluoromethyl-16α-methyl-4-pregnen-3β-ol-20-one
6β-trifluoromethyl-16β-methyl-4-pregnen-3β-ol-20-one
6,16β-dimethyl-4,6-pregnadien-3β-ol-20-one
6-fluoro-16α-methyl-4,6-pregnadien-3β-ol-20-one
6-fluoro-16β-methyl-4,6-pregnadien-3β-ol-20-one
6-chloro-16β-methyl-4,6-pregnadien-3β-ol-20-one
6-bromo-16α-methyl-4,6-pregnadien-3β-ol-20-one
6-bromo-16β-methyl-4,6-pregnadien-3β-ol-20-one
6-trifluoromethyl-16α-methyl-4,6-pregnadien-3β-ol-20-one
6-trifluoromethyl-16β-methyl-4,6-pregnadien-3β-ol-20-one
1α,2α-methylene-6α,16α-dimethyl-4-pregnen-3β-ol-20-one
1α,2α-methylene-6α,16β-dimethyl-4-pregnen-3β-ol-20-one
1α,2α-methylene-6β,16α-dimethyl-4-pregnen-3β-ol-20-one
1α,2α-methylene-6β,16β-dimethyl-4-pregnen-3β-ol-20-one
1α,2α-methylene-6α-fluoro-16α-methyl-4-pregnen-3β-ol-20-one
1α,2α-methylene-6α-fluoro-16β-methyl-4-pregnen-3β-ol-20-one
1α,2α-methylene-6β-fluoro-16α-methyl-4-pregnen-3β-ol-20-one
1,α,2α-methylene-6β-fluoro-16β-methyl-4-pregnen-3β-ol-20-one
1α,2α-methylene-6α-chloro-16α-methyl-4-pregnen-3β-ol-20-one
1α,2α-methylene-6α-chloro-16β-methyl-4-pregnen-3β-ol-20-one
1α,2α-methylene-6β-chloro-16α-methyl-4-pregnen-3β-ol-20-one
1α,2α-methylene-6β-chloro-16β-methyl-4-pregnen-3β-ol-20-one
1α,2α-methylene-6α-bromo-16α-methyl-4-pregnen-3β-ol-20-one
1α,2α-methylene-6α-bromo-16β-methyl-4-pregnen-3β-ol-20-one
1α,2α-methylene-6β-bromo-16α-methyl-4-pregnen-3β-ol-20-one
1α,2α-methylene-6β-bromo-16β-methyl-4-pregnen-3β-ol-20-one
1α,2α-methylene-6α-trifluoromethyl-16α-methyl-4-pregnen-3β-ol-20-one
1α,2α-methylene-6α-trifluoromethyl-16β-methyl-4-pregnen-3β-ol-20-one
1α,2α-methylene-6β-trifluoromethyl-16α-methyl-4-pregnen-3β-ol-20-one
1α,2α-methylene-6β-trifluoromethyl-16β-methyl-4-pregnen-3β-ol-20-one
1α,2α-methylene-6,16α-dimethyl-4,6-pregnadien-3β-ol-20-one
1α,2α-methylene-6,16β-dimethyl-4,6-pregnadien-3β-ol-20-one
1α,2α-methylene-6-fluoro-16α-methyl-4,6-pregnadien-3β-ol-20-one
1α,2α-methylene-6-fluoro-16β-methyl-4,6-pregnadien-3β-ol-20-one
1α,2α-methylene-6-chloro-16α-methyl-4,6-pregnadien-3β-ol-20-one
1α,2α-methylene-6-chloro-16β-methyl-4,6-pregnadien-3β-ol-20-one
1α,2α-methylene-6-bromo-16α-methyl-4,6-pregnadien-3β-ol-20-one
1α,2α-methylene-6-bromo-16β-methyl-4,6-pregnadien-3β-ol-20-one
1α,2α-methylene-6-trifluoromethyl-16α-methyl-4,6-pregnadien-3β-ol-20-one
1α,2α-methylene-6-trifluoromethyl-16β-methyl-4,6-pregnadien-3β-ol-20-one.

The following examples include pharmaceutical compositions of the novel compounds:

EXAMPLE A

Tablets

Each tablet contains:

|  | Mg. |
|---|---|
| 6α,16α-dimethyl-4-pregnene-3β-ol-20-one | 2 |
| Lactose | 70 |
| Potato starch | 26 |
| Magnesium stearate | 2 |

EXAMPLE B

Coated tablets

Each table contains:

|  | Mg. |
|---|---|
| 6α,16α-dimethyl--4-pregnene-3β-ol-20-one | 3 |
| Lactose | 80 |
| Corn starch | 15 |
| Talc | 2 |

The coating (150 mg.) is a conventional mixture of corn starch, sugar, talc, and tragacanth.

EXAMPLE C

Tablets

Each tablet contains:

|  | Mg. |
|---|---|
| 6α,16α-dimethyl-4-pregnene-3β-ol-20-one | 2 |
| 17α-ethynyl-estradiol | 0.06 |
| Lactose | 80 |
| Corn starch | 43 |
| Arrowroot | 15 |
| Talc | 8 |
| Colloidal silicic acid | 0.2 |
| Magnesium stearate | 2 |

Instead of the 17α-ethynyl-estradiol, another of the common estrogenic substances, such as 17α-ethynyl-estradiol-3-methyl ether, may be used.

Instead of the 6α,16α-dimethyl-4-pregnene-3β-ol-20-one, other compounds covered by Formula I or their 6,7-dehydro derivatives can be incorporated into similar compositions.

The preceding examples can be repeated with similar success by substituting the generically and specifically

What is claimed is:

1. A steroid selected from the group consisting of a compound of the following formula and the $\Delta^{6(7)}$ derivatives thereof:

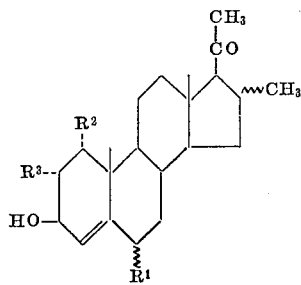

wherein
$R^1$ is F, Cl, Br, $CH_3$ or $CF_3$.
and
$R^2$ and $R^3$ each represents hydrogen or together represent —$CH_2$—.

2. A steroid as defined by claim 1, wherein said steroid has a single bond in the 6,7-position, and $R^2$ and $R^3$ each represents hydrogen.

3. A steroid as defined by claim 1, wherein $R^2$ and $R^3$ each represents hydrogen and a double bond is present in the 6,(7)-position.

4. A steroid as defined by claim 1, wherein $R^2$ and $R^3$ together represent —$CH_2$—, and there is a single bond present in the 6,(7)-position.

5. A steroid as defined by claim 1, wherein $R^2$ and $R^3$ together represent —$CH_2$—, and there is a double bond in the 6,(7)-position.

6. A steroid as defined by claim 1, wherein said steroid is 6α, 16α-dimethyl-4-pregnene-3β-ol-20-one.

7. A pharmaceutical composition containing 0.1–100 mg. of a steroid as defined by claim 1 and 1–5,000 mg. of a pharmaceutical carrier.

8. A pharmaceutical composition containing 0.1–100 mg. of a steroid as defined by claim 6 and 1–5,000 mg. of a pharmaceutical carrier.

References Cited

UNITED STATES PATENTS 3,352,889  11/1967  Fafebvre _____ 260—397.2
3,398,142   8/1968  Marshall _____ 260—239.55

FOREIGN PATENTS 654,958   4/1965  Belgium.

ELBERT L. ROBERTS, Primary Examiner

U.S. Cl. X.R.

260—397.4, 397.3, 397.5